April 14, 1970     H. F. SWENSON     3,506,253

T-SLOT JAW-CLAMP WORK HOLDER

Filed May 9, 1968

INVENTOR.
HENRY F. SWENSON

BY

*Ralph R. Roberts*

AGENT

United States Patent Office 3,506,253
Patented Apr. 14, 1970

3,506,253
T-SLOT JAW-CLAMP WORK HOLDER
Henry F. Swenson, 22 Homehill Lane,
Roseland, N.J. 07068
Filed May 9, 1968, Ser. No. 727,829
Int. Cl. B23q 3/02, 3/06
U.S. Cl. 269—137                                12 Claims

ABSTRACT OF THE DISCLOSURE

A T-slot jaw-clamp work holder in which a movable jaw or hold-down clamp member is supported by inclined front and rear ramp surfaces which are disposed to slidably engage and retain formed cam surfaces on the jaw as it is moved on and between the cam surfaces. The holder body has integrally formed shoulder members with upwardly extending tooth portions formed thereon, the tooth portions disposed so as to engage the undersurface of a T-slot of a worktable as the clamp is locked in position in the slot by means of jack screws provided in the front and rear portions of the work holder body.

BACKGROUND OF THE INVENTION

Field of the invention

The field of art to which this invention pertains is found in the class of work holders and more particularly in those sub-classes pertaining to work holders having a "relatively movable jaw" and "with means for hold-down component of force." Also the field of art pertaining to holders with an "inclined actuator and/or jaw travel," and "with wedge or cam means."

Description of the prior art

Vice-jaws, T-bolts and hold-down clamps are, of course, well known in the art and jaw members carried by angled ramps are shown in U.S. Patent 2,667,799 to Rzepela of Feb. 2, 1954 and also in U.S. Patent 3,090,612 to Rouse of May 12, 1963. These and other hold-down clamps are provided with movable hold-down jaw members which are moved or adjusted to retain or loosen a workpiece carried upon the table of a machine tool and the like.

As the complexity and size of the workpieces increase, it is necessary that the precise retention of the workpieces to the worktable be as positive as possible. The jaw-clamp of this invention provides a movable jaw which is positively and slidably retained in a body held in a T-slot.

SUMMARY OF THE INVENTION

The present invention contemplates a work holder having a body member provided with extending portions adapted to slide in a T-slot of a worktable. These extending portions have their upper surface formed with teeth which are disposed so as to engage the undersurface of the worktable T-slot to prevent the body member from sliding in the T-slot after the body has been tightened in the T-slot. Jack-screw members are provided in both the forward and rear portions of the clamp body member and are disposed to engage the bottom of the T-slot to urge the toothed upper surface of the extending portions of the body into engagement with the undersurface of the slot so as to lock the clamp body in the slot. The body has its upper portion formed with two sloped cam ramps of like angular disposition. The rear ramp is disposed so as to support the movable jaw and the thrust thereon as it is moved downwardly by means of a clamp bolt. The forward cam ramp is disposed to engage a forward cam surface on the movable jaw so as to guide the jaw and to prevent the jaw from lifting as the jaw is moved into clamping condition.

It is an object of this invention to provide a T-clamp having a movable jaw, which clamp has teeth portions formed on the upper surface of its T-slot engaging portions, with said portions engaging the undersurface of the T-slot of a worktable to retain the clamp body in the T-slot in a locked condition. The body of the clamp is provided with a pair of substantially parallel cam surfaces sized to support and retain, as a tongue member, a movable jaw as it is moved forwardly and downwardly into a work gripping position.

INTENT OF THE DISCLOSURE

Although the following disclosure offered for public dissemination is detailed to insure adequacy and aid in understanding of the invention, this is not intended to prejudice that purpose of a patent which is to cover each new inventive concept therein no matter how it may later be disguised by variations in form or additions of further improvements. The claims at the end hereof are intended as the chief aid toward this purpose, as it is these that meet the requirement of pointing out the parts, improvements or combinations or methods in which the inventive concepts are found.

There has been chosen a specific embodiment of a jaw-clamp work holder for use in a T-slot of a worktable. This specific embodiment and a modified jaw member have been chosen for the purposes of illustration and description as shown in the accompanying drawing wherein:

BRIEF DESCRIPTION OF THE DRAWING

In the following description and in the claims, various details will be identified by specific names for convenience; these names, however, are intended to be generic in their application. Corresponding reference characters refer to like members throughout the several figures of the drawing.

Figure 2:
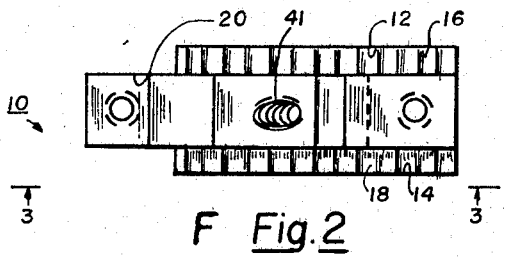
FIG. 2 represents a top or plan view of the body member of the clamp and looking downwardly in the direction of the arrows 2—2 of FIG. 3.

The drawing accompanying, and forming part of, this specification disclose certain details of construction for the purpose of explanation of the broader aspects of the invention, but it should be understood that structural details may be modified in various respects without departure from the concept and principles of the invention and that the invention may be incorporated in other structural forms than shown.

DESCRIPTION OF THE EMBODIMENT OF FIGS. 1 THROUGH 5

Figure 3:
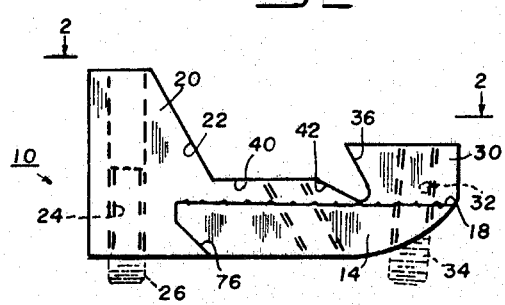
FIG. 3 represents a side view of the body member of FIG. 2, the view being taken on the line 3—3 of FIG. 2.
Figure 1:
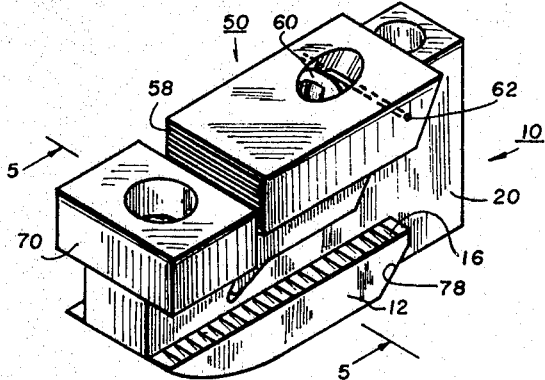
FIG. 1 represents an isometric view of the jaw-clamp work holder assembly of this invention and showing a clamp body with a front parallel bar member mounted thereon.

A jaw-clamp as seen in FIGS. 1, 2, and 3 includes a body member 10, which body has T-slot engaging wing members 12 and 14 formed on its bottom portion. These extending wing members have their upper surfaces 16 and 18 formed with teeth or sharp projections which are disposed to engage the undersurface of a T-slot of a worktable. These sharp projections, when the wing members are drawn tightly against the T-slot, provide a heavy partially embedded engagement with the undersurfaces of the T-slot. The rear of the clamp body is provided with an upstanding portion 20 which has formed thereon a cam or ramp surface 22 inclined at an angle of about sixty degrees to the surfaces 16 and 18 of the extending wing portions 12 and 14. This portion 20 has formed therein a threaded hole 24 into which a rear jack-screw 26 is rotatably mounted.

A front or forward portion 30 of the body 10 is provided with a tapped hole 32 which is disposed at a slight angle rearwardly of the vertical. Rotatably mounted in this hole 32 is a front jack-screw 34. This forward portion 30 has a rearwardly facing cam surface portion 36 formed thereon. The surface of said cam portion is made parallel to the slope of cam surface 22. A saddle portion 40 having a threaded hole 41 formed therein extends between the rear cam slope 22 and the forward cam slope 36. The forward portion of the saddle portion 40 has a notch portion 42 formed therein for the entrance and movement therein of a portion of a movable jaw 50 to be described below.

Figure 4:
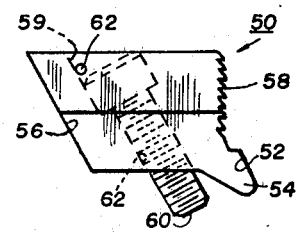
FIG. 4 represents a side view of the movable jaw-clamp member of the holder assembly.

The movable jaw member 50, as seen in FIG. 4, has a forward cam surface 52 formed as a part of the downwardly extending tongue portion 54. A rear cam surface 56 is formed on the jaw and is made parallel to cam surface 52. A toothed or serrated surface 58 is formed in the forward or face portion of the jaw member 50. This surface is disposed so as to move downwardly and forwardly to engage the workpiece which is to be retained by the jaw-clamp work holder. In jaw member 50 there is formed a counter-bored hole 59 in which is mounted a socket head cap screw 60. A retaining pin 62 is mounted in a cross-drilled hole and is disposed so as to engage the upper edge of the head of the cap screw and move the jaw member 50 upwardly and outwardly as the cap screw 60 is rotated in one direction. The shoulder of the head of the screw 60 engages the counterbore shoulder in hole 59 as the screw is rotated in the other direction to move jaw member 50 forwardly and downwardly. The threaded end of screw 60 extends through the shoulder screw hole 59 and engages threaded hole 41 in block 10. The cap screw 60 and threaded hole 41 are disposed at the same angle as the forward and rear cam slopes 52 and 56.

The assembly of FIG. 1 includes a parallel pad 70 which is retained by a cap screw (not shown), whose threaded end is mounted in the threaded hole 32 of the body 10. The pad 70 provides a determined parallel surface above the worktable. This block 70 is positioned so that the jaw 50, in its forwardmost movement, has its toothed surface 58 disposed a small distance away from engagement with the block 70.

Figure 5:
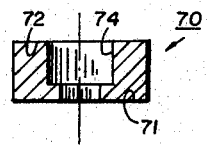
FIG. 5 represents a sectional view of the front parallel bar of FIG. 1.

Referring particularly to FIG. 5, it is noted that the parallel pad 70 has surfaces 71 and 72 preferably, precisely ground to a determined parallelism and spacing. A counterbored hole 74 is sized to receive the entire head of a socket head cap screw so that when the pad 70 is mounted on the worktable with the threaded end of the cap screw entered into the threaded hole 32 of body 10, the upper support surface 72 provides an unobstructed surface for supporting the workpiece. Several pads and clamps may be used to provide a support plane of determined support locations. Of course, all pads used are of the same precise thickness to provide a common plane of support above the worktable.

USE AND OPERATION OF CLAMP OF FIGS. 1 THROUGH 5

It is to be noted that the wing members 12 and 14 are rounded at their forward ends so that the block may be easily entered into a traverse slot of a worktable and then moved into a T-slot portion of the table. The slot engaging wing members 12 and 14 are of a determined length and preferably have the back or rear ends of the members 12 and 14 beveled to form slopes 76 and 78. The forward arcuate portion and beveled rear ends of the members 12 and 14 are sized to permit easy insertion of the body 10 and wing members 12 and 14 into the T-slot.

After the body 10 is moved into the T-slot to the desired position, the jack-screws 26 and 34 are turned inwardly or downwardly so as to engage the bottom of the T-slot and force the upper surfaces 16 and 18 against the undersurface of the T-slot, causing the body 10 to be locked in a determined location in the T-slot. The jaw member 50 is movable in the cam supporting guideways defined by surfaces 22 and 36 with the threaded hole 41 receiving the threaded end of screw 60. The jaw member 50 is moved by screw 50 to a receiving condition, after which the workpiece (not shown) is placed in position on the worktable. The screw 60 is then rotated to cause the jaw member 50 to move forwardly and downwardly, bringing the tooth surface 58 into engagement with the workpiece to be retained. The screw 60 is further turned until the workpiece is gripped with the desired force. The force transmitted by the screw 60 into the forward and downward thrust of the tooth portion 58 of the jaw 50 against the piece being gripped causes a like force to be transmitted by the cam surface 56 of the jaw member against cam ramp 22. The overturning or lifting moment of the forward end of the jaw member 50 is controlled by the engagement of forward cam surface 52 as it moves forwardly against cam surface 36. Cam surface 36 retains the forward portion of the jaw member 50 in the determined gripping condition and prevents any lifting of the jaw member 50. Thus retained, the movement of the member 50 is provided without a bending action or force against screw 60.

The sharp tooth portions 16 and 18 of the slot-engaging wing portions 12 and 14 cause the body 10 to be tightly retained in the T-slot as the gripping downward thrust of the member 50 is increased. The greater the downward thrust of the jaw member 50 on the workpiece, the greater the force applied by the tooth portions 16 and 18 against the undersurface of the T-slot. Surface blocks 70 may or may not be used with this clamp, as desired by the operator. When they are desired, they are mounted on the worktable with a cap screw in counterbored hole 74 tightened in the tapped hole 32. It is to be noted that, as shown, the upper portion of the movable jaw 50 is made wider than the shank portion which is sized so as to engage the cam ramps 36 and 22. This wider jaw position is merely a matter of selection as the width of the jaw member 50 is made to suit a given set of conditions. The size of the clamp is proportioned to fit various size T-slots.

DESCRIPTION OF JAW MEMBER OF FIG. 6

Figure 6:
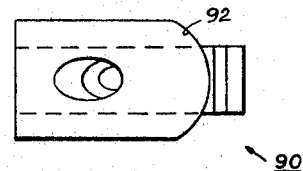
FIG. 6 represents a plan view of an alternate movable jaw-clamp member.

Referring finally to the jaw member of FIG. 6, there is shown a plan view of a jaw member 90 which, except for its work engaging face portion, is substantially identical in structure and use to the jaw member 50 above-described. The jaw member 90 has its face portion formed into an arcuate configuration 92. This face portion is also preferably toothed, knurled or serrated to provide an engaging or non-slip surface. This arcuate shape may be generated as by a radius, as an ellipse, or may be a combination of a short, straight midportion with radiused or curved corners.

The precise configuration is a matter of selection to accommodate the work retaining conditions. As reduced to practice, all forms are practical and in certain circumstances desirable.

USE OF JAW MEMBER OF FIG. 6

The jaw member 90 is mounted in a body 10 and is used in a T-slot as an assembly in the manner of the jaw clamp of FIG. 1. Particularly the T-slots of rotary tables may be disposed so that the face of the jaw-clamp may tangentially engage the workpiece being held or retained. The curved face permits the toothed surface of the jaw to engage and retain round or irregularly shaped pieces.

Terms such as "up," "down," "bottom," "top," "front," "back," "in," "out," and the like are applicable to the embodiments shown and described in conjunction with the drawing. These terms are merely for the purposes of description and do not necessarily apply to the position in which the jaw-clamp work holder may be constructed or used.

Protection by Letters Patent of this invention in all its aspects, as the same are set forth in the appended claims, is sought to the broadest extent the prior art allows.

What is claimed is:

1. A T-slot jaw-clamp work holder disposed to be mounted in the T-slot of a worktable and the like, the jaw-clamp having a jaw member movable forwardly and downwardly to engage and retain a workpiece and rearwardly and upwardly to release the workpiece, said work holder including: (a) body member having a pair of opposed T-slot engaging wing members formed on its bottom portion; (b) at least one jack-screw threaded hole formed in and extending through the body member; (c) a jack-screw mounted in the threaded hole and disposed to be advanced in said threaded hole to engage the bottom of the T-slot and urge the wing members into locking engagement in the T-slot; (d) an upstanding rear portion formed on the body member, said rear portion having its forward face formed to provide a ramp surface inclined rearwardly at an angle of less than ninety degrees to the upper surface of the T-slot engaging wing members; (e) an upwardly extending forward portion formed on the body member, said forward portion having its rearward face formed to provide a front ramp surface parallel to the rear ramp surface and between the two surfaces to provide a determinedly spaced retaining groove; (f) a movable jaw member having a front cam surface and a rear cam surface parallel to the front cam surface, said surfaces spaced to slidably engage the rear and forward ramp surfaces of the body member, the jaw member having a workpiece engaging surface formed on the forward portion of the jaw member, and (g) means for moving the jaw member on the ramp surfaces of the body member, the forward ramp surface disposed to slidably engage and retain the forward cam surface of the jaw member and prevent the lifting of the jaw member as the jaw member is moved to engage the workpiece to retain said workpiece.

2. A T-slot jaw-clamp work holder as in claim 1 in which the body member is provided with a pair of threaded jaw-screw holes, one of said holes being disposed in the rear portion of the body and one hole being disposed in the forward portion of the body member, and a jack-screw is rotatably mounted in each of said jack-screw holes.

3. A T-slot jaw-clamp work holder as in claim 2 in which the jack-screw hole in the forward body member is disposed at a slight angle rearwardly of the vertical.

4. A T-slot jaw-clamp work holder as in claim 2 in which the T-slot wing portions of the body is formed integral therewith, the wing portions have their upper surface formed with toothed portions extending upwardly.

5. A T-slot jaw-clamp work holder as in claim 2 in which the movable jaw member has its forward cam surface formed as a part of a downwardly extending tongue portion disposed forwardly of the workpiece engaging surface formed on the forward portion of the jaw; and in which the body member has a saddle portion extending between the rear and front ramp surfaces and with the forward portion of the saddle having a notch formed therein, the notch sized and positioned to receive the tongue portion of the jaw member as it is moved in the body member.

6. A T-slot jaw-clamp work holder as in claim 2 in which the forward and rear ramp surfaces of the body member are disposed at about sixty degrees included angle with the upper surface of the T-slot engaging wing members.

7. A T-slot jaw-clamp work holder as in claim 2 in which the forward portion of the body member is formed so that when the body is mounted in the T-slot said forward portion of the body is disposed below the work surface of the worktable having the T-slot.

8. A T-slot jaw-clamp work holder as in claim 7 in which there is provided an additional parallel pad separable from the work holder but mountable therewith, said pad having a counterbored hole therein and through the hole disposed to receive and retain a cap screw, the parallel pad having precisely spaced upper and lower surfaces, the pad sized so as to be mountable above the front body portion with a cap screw rotatably engaged in the counterbored hole of the pad and with the threaded end of said cap screw entering the forward jack-screw hole of the clamp body.

9. A T-slot jaw-clamp work holder as in claim 2 in which the workpiece engaging surface formed on the forward portion of the jaw member is formed with an arcuate configuration.

10. A T-slot jaw-clamp work holder as in claim 2 in which the means for moving the jaw is a cap screw carried in a counterbored hole in the jaw member; and in which the head of the cap screw is rotatably retained in said counterbore; and in which the body member has a threaded hole adapted to receive the threaded end of the cap screw, the counterbored hole in the jaw member having its axis disposed in a plane parallel to the front and rear cam surfaces, and the threaded hole in the body member is disposed at an angle parallel to the front and rear ramp surfaces and positioned to receive the threaded end of the cap screw.

11. A T-slot jaw-clamp work holder as in claim 10 in which the retention of the head of the cap screw in the jaw member is a pin carried in a cross-drilled hole.

12. A T-slot jaw-clamp work holder as in claim 2 in which the components of the work holder assembly are of steel, and in which the screws are socket-head type.

References Cited

UNITED STATES PATENTS

| | | | |
|---|---|---|---|
| 1,060,980 | 5/1913 | Hammann | 269—134 X |
| 2,637,249 | 5/1953 | Swenson | 269—91 X |
| 2,667,799 | 2/1954 | Rzepela. | |

FOREIGN PATENTS 627,395  8/1949  Great Britain.

ROBERT C. RIORDON, Primary Examiner

U.S. Cl. X.R.

269—91